United States Patent
Chen et al.

(10) Patent No.: US 9,292,317 B2
(45) Date of Patent: *Mar. 22, 2016

(54) CLOUD OF VIRTUAL CLOUDS FOR INCREASING ISOLATION AMONG EXECUTION DOMAINS

(75) Inventors: Han Chen, White Plains, NY (US); Hui Lei, Scarsdale, NY (US); Zhe Zhang, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 220 days.

This patent is subject to a terminal disclaimer.

(21) Appl. No.: 13/613,510

(22) Filed: Sep. 13, 2012

(65) Prior Publication Data

US 2013/0232486 A1 Sep. 5, 2013

Related U.S. Application Data

(63) Continuation of application No. 13/409,455, filed on Mar. 1, 2012.

(51) Int. Cl.
*G06F 9/46* (2006.01)
*G06F 9/455* (2006.01)

(52) U.S. Cl.
CPC ............ *G06F 9/455* (2013.01); *G06F 9/45558* (2013.01); *G06F 2009/45566* (2013.01)

(58) Field of Classification Search
None
See application file for complete search history.

(56) References Cited

U.S. PATENT DOCUMENTS

| 5,269,016 | A | 12/1993 | Butler et al. | |
|---|---|---|---|---|
| 6,671,821 | B1 | 12/2003 | Castro et al. | |
| 6,957,331 | B2 | 10/2005 | Kursawe et al. | |
| 7,552,426 | B2* | 6/2009 | Traut | 717/138 |
| 7,797,457 | B2 | 9/2010 | Lamport | |
| 2005/0076186 | A1* | 4/2005 | Traut | 712/1 |
| 2009/0193399 | A1* | 7/2009 | Mitran et al. | 717/139 |
| 2010/0125664 | A1* | 5/2010 | Hadar et al. | 709/224 |
| 2010/0125708 | A1* | 5/2010 | Hall et al. | 711/154 |
| 2010/0332658 | A1* | 12/2010 | Elyashev | 709/226 |
| 2011/0072428 | A1 | 3/2011 | Day, II et al. | |
| 2011/0153909 | A1 | 6/2011 | Dong | |
| 2011/0302449 | A1* | 12/2011 | Douceur et al. | 714/15 |
| 2012/0131571 | A1* | 5/2012 | Ben-Yehuda et al. | 718/1 |

(Continued)

OTHER PUBLICATIONS

Ben-Yehuda et al., "The Turtles Project: Design and Implementation of Nested Virtualization", Jan. 9, 2010.*

(Continued)

*Primary Examiner* — Abdullah Al Kawsar
*Assistant Examiner* — Bradley Teets
(74) *Attorney, Agent, or Firm* — Ryan, Mason & Lewis, LLP (57) ABSTRACT

A method for providing a cloud environment for provisioning a guest virtual machine instance. The method includes selecting at least one machine from a collection of machines as a management node, wherein the at least one machine includes a hypervisor enabled with nested virtualization capability, deploying a plurality of cloud managers on each management node, selecting at least one machine from the collection of machines as a host node, deploying a plurality of level two hypervisors on each host node, forming a plurality of virtual clouds, wherein each virtual cloud contains at least one of the plurality of cloud managers and one of the plurality of level two hypervisors, and provisioning, via the at least one cloud manager, at least one guest virtual machine instance on top of the at least one level two hypervisors.

10 Claims, 4 Drawing Sheets

(56) References Cited

U.S. PATENT DOCUMENTS

2012/0191948 A1* 7/2012 Day et al. .................. 712/205
2012/0260247 A1* 10/2012 Huang et al. .................. 718/1
2013/0139159 A1* 5/2013 Eidus et al. .................. 718/1

OTHER PUBLICATIONS

Chun et al., "Diverse Replication for Single-Machine Byzantine-Fault Tolerance", USENIX'08, pp. 1-6.*
Bugiel et al., "Twin Clouds: An Architecture for Secure Cloud Computing, Workshop on Cryptography and Security in Clouds", 2011, pp. 1-11.*
Chun et al., Diverse Replication for Single-Machine Byzantine-Fault Tolerance, USENIX'08, pp. 1-6.
Ben-Yehuda et al., The Turtles Project: Design and Implementation of Nested Virtualization, OSDI'10, pp. 1-14.
Bugiel et al., Twin Clouds: An Architecture for Secure Cloud Computing, Workshop on Cryptography and Security in Clouds 2011, pp. 1-11.

* cited by examiner

CLOUD OF VIRTUAL CLOUDS FOR INCREASING ISOLATION AMONG EXECUTION DOMAINS

CROSS-REFERENCE TO RELATED APPLICATIONS

This application is a continuation of U.S. patent application Ser. No. 13/409,455, filed Mar. 1, 2012, incorporated by reference herein.

FIELD OF THE INVENTION

Embodiments of the invention generally relate to information technology, and, more particularly, to cloud computing.

BACKGROUND

In existing cloud computing models, all virtual machine (VM) instances run in a single shared execution domain. The same host operating system (OS) and hypervisor stack is used across the cloud. Meanwhile, the guest systems, containing a guest OS and application, are under full control of cloud users. A single cloud manager handles VM provisioning, migration, and de-provisioning operations. Computing resources, including central processing unit (CPU) and memory, are typically over-committed across all VM instances. This has created several problems.

For example, due to the complexity, frequent updates and close interactions with cloud and web users, guest systems and cloud managers are highly vulnerable to external attacks. Also, a single attack could penetrate all hypervisors, which are of the same type, and compromise the entire cloud. Additionally, malicious code can propagate in the cloud through shared resources. Further, resource over-commitment causes performance degradations and uncertainties to individual applications.

SUMMARY

In one aspect of the present invention, techniques for providing a cloud of virtual clouds (CVC) for increasing isolation among execution domains are provided. An exemplary computer-implemented method for providing a cloud environment for provisioning a guest virtual machine instance can include steps of selecting at least one machine from a collection of machines as a management node, wherein the at least one machine includes a hypervisor enabled with nested virtualization capability, deploying a plurality of cloud managers on each management node, selecting at least one machine from the collection of machines as a host node, deploying a plurality of level two hypervisors on each host node, forming a plurality of virtual clouds, wherein each virtual cloud contains at least one of the plurality of cloud managers and one of the plurality of level two hypervisors, and provisioning, via the at least one cloud manager, at least one guest virtual machine instance on top of the at least one level two hypervisors.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and operative to perform noted method steps. Yet further, another aspect of the invention or elements thereof can be implemented in the form of means for carrying out the method steps described herein, or elements thereof; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an aspect of the present invention includes a cloud of virtual clouds (CVC) for increased resilience and stable performance. At least one embodiment of the invention includes providing a cloud environment with diversified and isolated execution domains within a single data center. Accordingly, unlike in disadvantageous existing approaches, applications in each execution domain can fail independently, and therefore the resilience of the cloud is enhanced. Also, in at least one embodiment of the invention, the resource allocation decisions can be made hierarchically, making it possible to provide improved overall performance of an execution domain.

An aspect of the invention includes leveraging nested virtualization techniques to create multiple virtual clouds, and developing mechanisms to diversify the software stack used in each virtual cloud as well as control the communications between virtual clouds. Compared to existing approaches based on a single cloud, CVC enhances the cloud resilience. For example, a customer application replicated in multiple virtual clouds will be able to tolerate Byzantine failures, including both crashing failures, where a component stops working, and correctness failures, where a component keeps working but produces incorrect outputs in an arbitrary way.

Compared to existing approaches based on multiple virtual clouds, CVC is more cost-efficient because only a single pool of physical resources needs to be maintained and administrated. An aspect of the invention also includes enabling opportunities to maximize server utilization by multiplexing different workload patterns. Moreover, CVC can enable a cloud-as-a-service mode. In such a mode, the amount of physical resources allocated to a virtual cloud can be strictly specified and enforced. Meanwhile, resource over-commitment is allowed within each virtual cloud.

Figure 1:
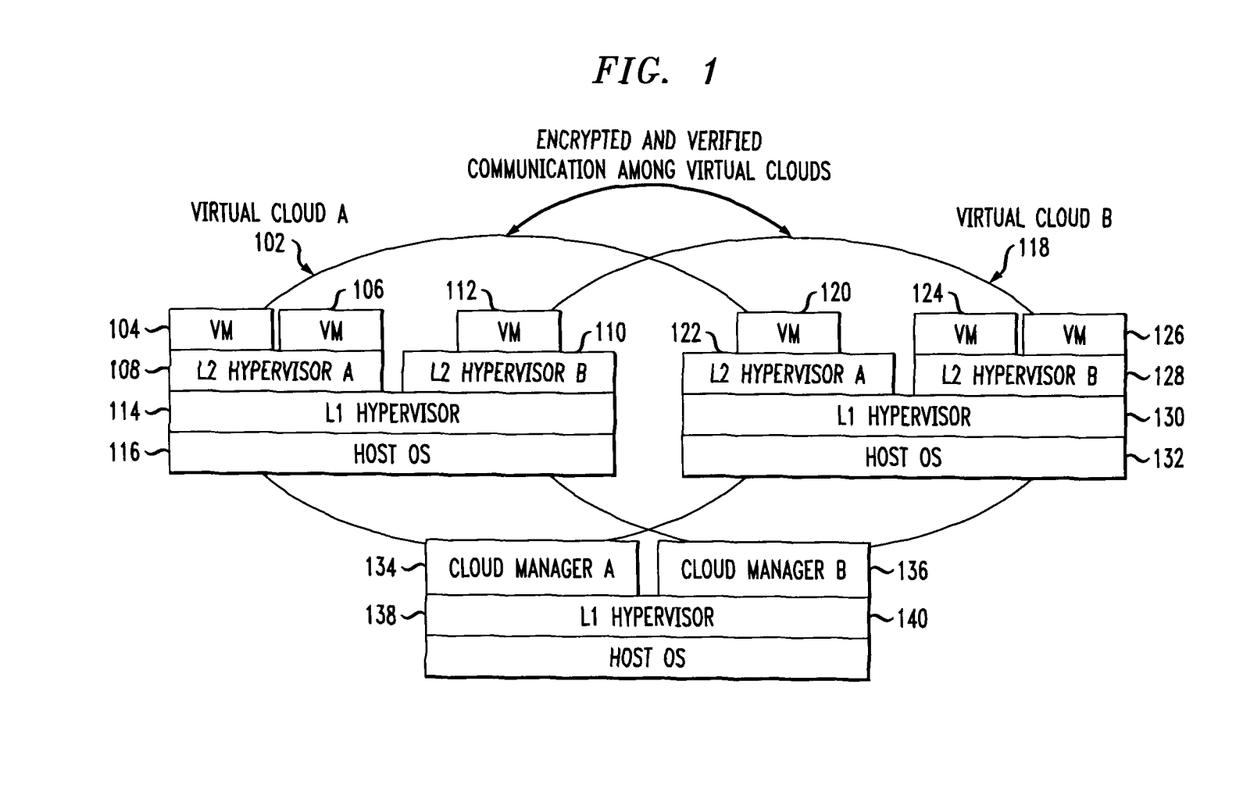
FIG. 1 is a diagram illustrating cloud of virtual clouds (CVC) architecture, according to an embodiment of the present invention.

FIG. 1 is a diagram illustrating cloud of virtual clouds (CVC) architecture, according to an embodiment of the present invention. By way of illustration, FIG. 1 depicts a data center that includes a pool of physical hosts, such as host operation systems 116, 132 and 140. These hosts can operate in multiple virtual clouds, such as virtual cloud A 102 and virtual cloud B 118. An embodiment of the invention uses nested virtualization techniques to run a level 1 hypervisor (L1 hypervisor) (such as components 114, 130 and 138 in FIG. 1) on each host. Multiple level 2 hypervisors (L2 hypervisor) can then commence on each level 1 hypervisor. As depicted in FIG. 1, these include L2 hypervisor A 108, L2 hypervisor B 110, L2 hypervisor A 122 and L2 hypervisor B 128.

An aspect of the invention can include allowing multiple unmodified level 2 hypervisors, including kernel-based virtual machine (KVM) and VMware, to run on top of a single level 1 KVM hypervisor. After the level 2 hypervisors, multiple virtual clouds can be created (such as VMs 104, 106, 112, 120, 124 and 126 in FIG. 1), each of which can use a different type of level 2 hypervisor and a different cloud manager. As also depicted in FIG. 1, cloud managers include cloud manager A 134 and cloud manager B 136. The level 2 hypervisors serve as compute hosts in virtual clouds.

Also, an embodiment of the invention includes developing intelligent mechanisms to allocate each virtual cloud on a set of physical hosts. Depending on the requirement for resilience, users can choose to replicate individual applications with different replication degrees in multiple virtual clouds. For each replicated application, all communications among its replicas, and from its replicas in CVC to external computers, can be encrypted and verified, for example, via Byzantine Fault Tolerance (BFT) consensus protocols.

By creating multiple virtual clouds and placing replicas of a customer application across them, at least one embodiment of the invention largely eliminates the possibility that a single attack through a guest application or guest operating system (OS) could propagate throughout the entire cloud environment and compromise other applications. Additionally, communications among virtual clouds can be verified to control the propagation of malware, and outvote incorrect outputs.

Figure 2:
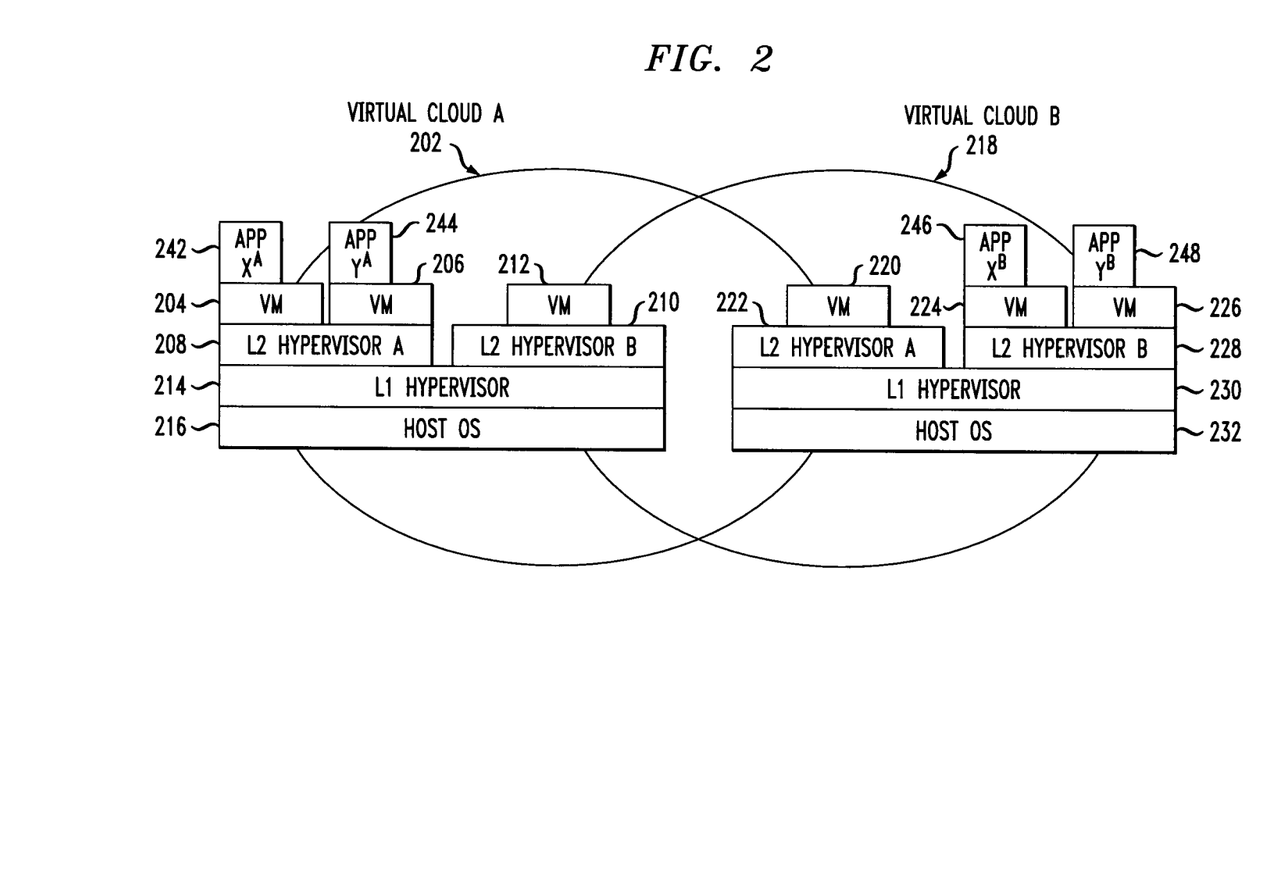
FIG. 2 is a diagram illustrating a malicious attack scenario, according to an embodiment of the present invention.

FIG. 2 is a diagram illustrating a malicious attack scenario, according to an embodiment of the present invention. By way of illustration, FIG. 2 depicts, similarly to FIG. 1, a data center that includes a pool of physical hosts, such as host operation systems 216 and 232. These hosts can operate in multiple virtual clouds, such as virtual cloud A 202 and virtual cloud B 218. Nested virtualization techniques can be used to run a level 1 hypervisor (L1 hypervisor) (such as components 214 and 230) on each host. Multiple level 2 hypervisors (L2 hypervisor) can commence on each level 1 hypervisor. As depicted in FIG. 2, these include L2 hypervisor A 208, L2 hypervisor B 210, L2 hypervisor A 222 and L2 hypervisor B 228.

After the level 2 hypervisors, multiple virtual clouds can be created (such as VMs 204, 206, 212, 220, 224 and 226), each of which can use a different type of level 2 hypervisor. As also depicted in FIG. 2, it is assumed that there are two applications X and Y, both of which are replicated in virtual clouds A and B with replicas $X^A$ 242, $X^B$ 246 and $Y^A$ 244, $Y^B$ 248. If $X^A$ is attacked, the attack could affect the entire guest VM operating system and eventually the hypervisor. This is possible if there are multiple levels of vulnerabilities. For example, malicious code could become a user of the application through cracking the password, gain root access to the guest OS by leveraging an OS buffer overflow, and enter the hypervisor space through a bug in function call return.

If this happens, $Y^A$ will also be compromised because it resides on the affected hypervisor. However, in this example, the attack cannot stop the entire application Y from correctly functioning because $Y^B$ runs on a different failure domain. Even if the attack takes control of the guest VM running application X, it cannot penetrate the level 2 hypervisor in virtual cloud B, which is different from the level 2 hypervisor in virtual cloud A.

Figure 3:
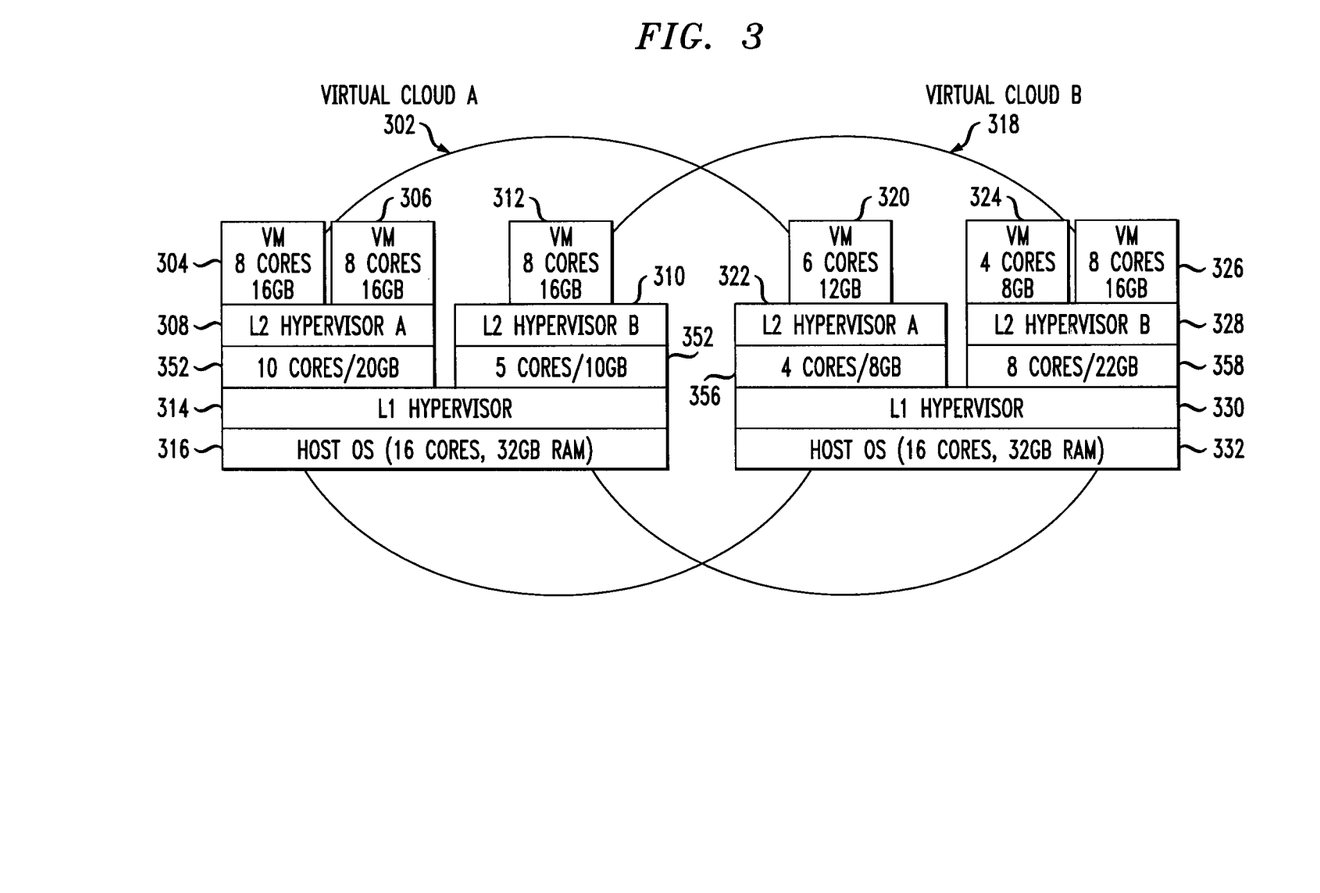
FIG. 3 is a diagram illustrating a cloud-as-a-service scenario, according to an embodiment of the present invention.

FIG. 3 is a diagram illustrating a cloud-as-a-service scenario, according to an embodiment of the present invention. By way of illustration, FIG. 3 depicts, similarly again to FIG. 1, a data center that includes a pool of physical hosts, such as host operation systems 316 and 332. These hosts can operate in multiple virtual clouds, such as virtual cloud A 302 and virtual cloud B 318. Nested virtualization techniques can be used to run a level 1 hypervisor (L1 hypervisor) (such as components 314 and 330) on each host. Multiple level 2 hypervisors (L2 hypervisor) can commence on each level 1 hypervisor. As depicted in FIG. 3, these include L2 hypervisor A 308, L2 hypervisor B 310, L2 hypervisor A 322 and L2 hypervisor B 328. After the level 2 hypervisors, multiple virtual clouds can be created (such as VMs 304, 306, 312, 320, 324 and 326), each of which can use a different type of level 2 hypervisor.

As also illustrated in the example depicted in FIG. 3, suppose that the entire physical cloud has two physical hosts, each with 16 central processing unit (CPU) cores and 32 gigabytes (GB) of random access memory (RAM) main memory. Per user request, two virtual clouds can be created: virtual cloud A with a total capacity of 14 cores and 28 GB memory and virtual cloud B with a total capacity of 13 cores and 32 GB memory. The allocation of the total amount of computing resource to each virtual cloud can be enforced at the L1 hypervisor layer, with mechanisms such as CPU core binding and memory region assignment. For example, on the left-most physical host in FIG. 3, L2 hypervisor A is allocated 10 cores and 20 GB of memory (as illustrated by component 352) and L2 hypervisor B is allocated 5 cores and 10 GB of memory (as illustrated by component 354). Also, on the right-most physical host in FIG. 3, L2 hypervisor A is allocated 4 cores and 8 GB of memory (as illustrated by component 356) and L2 hypervisor B is allocated 8 cores and 22 GB of memory (as illustrated by component 358).

Within each virtual cloud, resource over-commitment is allowed. For example, with the 10 cores and 20 GB memory allocated to it, L2 hypervisor A 308 on the left-most physical host can serve 2 VM instances, each requiring a size of 8 cores and 16 GB of memory (such as depicted by VM 304 and VM 306).

As also detailed herein, on each physical host, an embodiment of the invention can include enforcing a strict resource allocation policy. One example embodiment of the invention can include physical segregation of resources to improve performance isolation (CPU core binding, memory region allocation, etc.). Additionally, allocation policy on each host can change over time, with a low frequency. Further, in an embodiment of the invention, an entire L2 hypervisor unit can be migrated to consolidate workload and increase server utilization.

Figure 4:
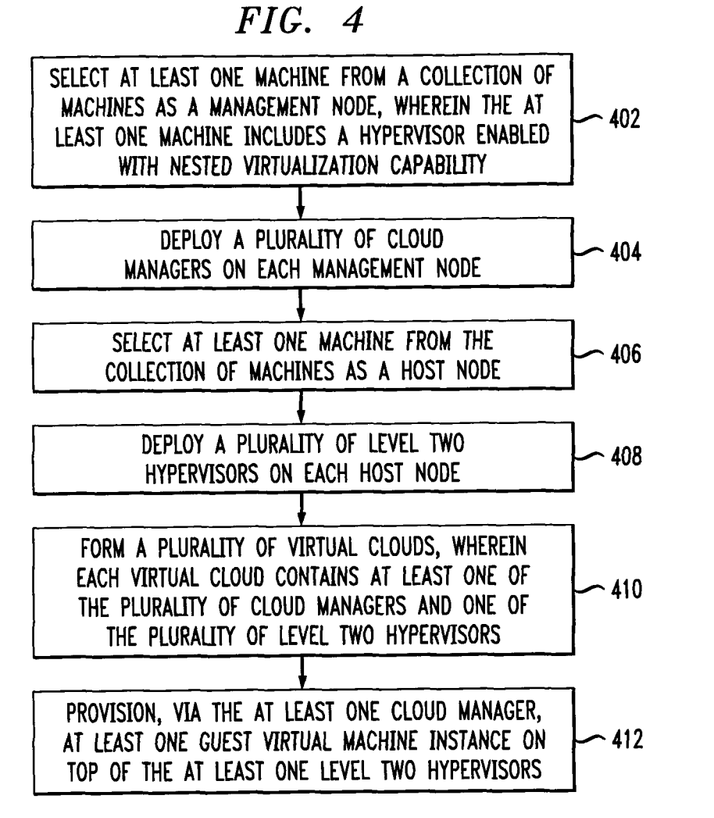
FIG. 4 is a flow diagram illustrating techniques for providing a cloud environment for provisioning a guest virtual machine instance, according to an embodiment of the invention.

FIG. 4 is a flow diagram illustrating techniques for providing a cloud environment for provisioning a guest virtual machine instance, according to an embodiment of the present invention. Step 402 includes selecting at least one machine from a collection of machines as a management node, wherein the at least one machine includes a hypervisor enabled with nested virtualization capability. Step 404 includes deploying a plurality of cloud managers on each management node. Step 406 includes selecting at least one machine from the collection of machines as a host node. Step 408 includes deploying a plurality of level two hypervisors on each host node. Step 410 includes forming a plurality of virtual clouds, wherein each virtual cloud contains at least one of the plurality of cloud managers and one of the plurality of level two hypervisors.

Step 412 includes provisioning, via the at least one cloud manager, at least one guest virtual machine instance on top of the at least one level two hypervisors. Provisioning at least one guest virtual machine instance on top of the at least one level two hypervisors can include provisioning per a request from a cloud user.

In an example embodiment of the invention, at least two different cloud managers and at least two different level two hypervisors are used.

Further, the techniques depicted in FIG. 4 can include deploying an instance of a single application across each of the plurality of virtual clouds, as well as running a Byzantine Fault Tolerance (BFT) consensus protocol among each application instance. The BFT protocol will run the same copy of a computer program on multiple application instances and compare the outputs from the multiple instances. The output is confirmed and presented to users only if at least a certain number of instances have reached an agreement. This guarantees the security of the program in face of malicious attacks; even if a malicious program has compromised several instances, the user will get correct outputs as long as the majority of instances remain safe.

Aspects of the invention can additionally include controlling communication between the plurality of virtual clouds, and specifying an amount of physical resources allocated to each of the plurality of virtual clouds. At least one embodiment of the invention can also include enabling physical resource allocation modification on each virtual cloud (for example, over time).

Additionally, in accordance with at least one embodiment of the invention, resource over-commitment is allowed within each virtual cloud, each virtual cloud can be allocated on a set of physical hosts.

The techniques depicted in FIG. 4 can also, as described herein, include providing a system, wherein the system includes distinct software modules, each of the distinct software modules being embodied on a tangible computer-readable recordable storage medium. All the modules (or any subset thereof) can be on the same medium, or each can be on a different medium, for example. The modules can include any or all of the components shown in the figures. In an aspect of the invention, the modules can run, for example on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 4 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Figure 5:
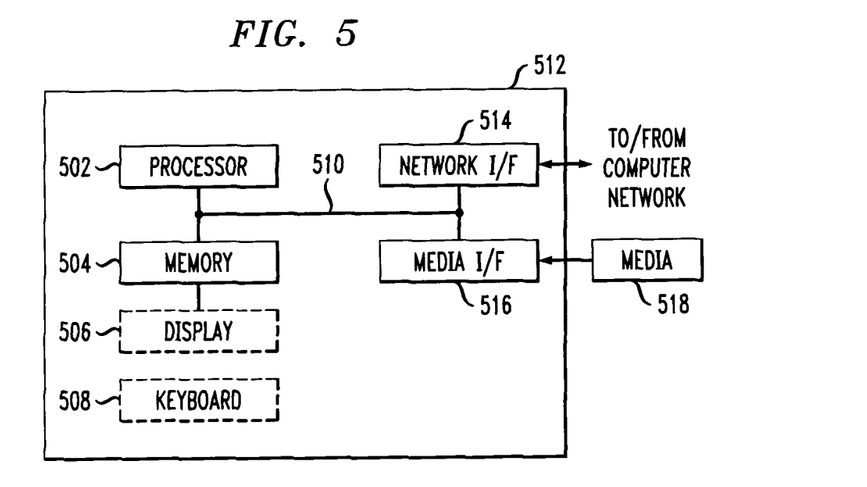
FIG. 5 is a system diagram of an exemplary computer system on which at least one embodiment of the invention can be implemented.

Additionally, an aspect of the present invention can make use of software running on a general purpose computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in an associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 508, displays 506, pointing devices, and the like)

can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

As noted, aspects of the present invention may take the form of a computer program product embodied in a computer readable medium having computer readable program code embodied thereon. Also, any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in FIG. 1. The method steps can then be carried out using the distinct software modules and/or sub-modules of the system, as described above, executing on a hardware processor 502. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one aspect of the present invention may provide a beneficial effect such as, for example, enhancing the resilience of a cloud by enabling applications in each of multiple execution domains to fail independently.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for providing a cloud environment for provisioning a guest virtual machine instance, wherein the method comprises:
   deploying a level one hypervisor enabled with nested virtualization capability on each of multiple host operating systems running on a plurality of host nodes within a data center, wherein each of the multiple host operating systems operate in each of two or more virtual clouds, and wherein the two or more virtual clouds include two or more distinct cloud managers, wherein the two or more distinct cloud managers are deployed on a level one hypervisor executing on a host operating system on a management node;
   deploying a plurality of level two hypervisors on each level one hypervisor deployed on each of multiple host operating systems;
   provisioning, via the two or more distinct cloud managers within the two or more virtual clouds, multiple guest virtual machine instances of multiple guest virtual machine types on top of the plurality of level two hypervisors, wherein each of the plurality of level two hypervisors has at least one of the multiple guest virtual machine instances provisioned thereon, thereby providing the cloud environment with multiple isolated execution domains within the data center;
   deploying at least one application instance within each of the multiple guest virtual machine instances; and
   wherein the steps are carried out by at least one computer device.

2. The method of claim 1, wherein said provisioning comprises provisioning per a request from a cloud user.

3. The method of claim 1, wherein said plurality of level two hypervisors comprises at least two different types of level two hypervisors.

4. The method of claim 1, further comprising:
   deploying an instance of a single application across each of the two or more virtual clouds.

5. The method of claim 4, further comprising:
   running a Byzantine Fault Tolerance (BFT) consensus protocol among each application instance.

6. The method of claim 1, further comprising:
   controlling communication between the two or more virtual clouds.

7. The method of claim 1, further comprising:
   specifying an amount of physical resources allocated to each of the two or more virtual clouds.

8. The method of claim 7, further comprising:
   enabling physical resource allocation modification on each of the two or more virtual clouds.

9. The method of claim 1, wherein resource over-commitment is allowed within each of the two or more virtual clouds.

10. The method of claim 1, further comprising:
    allocating each of the two or more virtual clouds on a set of physical hosts.

* * * * *